United States Patent
Iwai et al.

(10) Patent No.: US 6,317,291 B1
(45) Date of Patent: Nov. 13, 2001

(54) THIN-FILM MAGNETIC HEAD HAVING IMPROVED DATA WRITING CHARACTERISTICS AND A METHOD OF MAKING THE SAME

(75) Inventors: Yuzuru Iwai; Noboru Yamanaka; Yoshihiro Kudo, all of Tokyo (JP)

(73) Assignee: TDK Corporation, Tokyo (JP)

(*) Notice: Subject to any disclaimer, the term of this patent is extended or adjusted under 35 U.S.C. 154(b) by 0 days.

(21) Appl. No.: 09/389,753

(22) Filed: Sep. 7, 1999

(30) Foreign Application Priority Data

Sep. 24, 1998 (JP) .................................. 10-269392

(51) Int. Cl.[7] .................................. G11B 5/31; G11B 5/17
(52) U.S. Cl. .................................. 360/126
(58) Field of Search .................................. 360/126, 125, 360/317

(56) References Cited

U.S. PATENT DOCUMENTS

| | | | |
|---|---|---|---|
| 4,713,711 | * 12/1987 | Jones, Jr. et al. | 360/123 |
| 5,621,596 | 4/1997 | Santini | 360/126 |
| 6,101,068 | * 8/2000 | Ohtomo et al. | 360/126 |
| 6,134,080 | * 10/2000 | Chang et al. | 360/126 |
| 6,181,514 | * 1/2001 | Santini et al. | 360/126 |

FOREIGN PATENT DOCUMENTS

| | | |
|---|---|---|
| A-3-132910 | 6/1991 | (JP) . |
| A-8-87717 | 4/1996 | (JP) . |

* cited by examiner

*Primary Examiner*—David L. Ometz
(74) *Attorney, Agent, or Firm*—Oliff & Berridge, PLC

(57) ABSTRACT

It is an object of the invention to improve characteristics of a thin-film magnetic head in the case where the frequency of data to write is high, in particular. In a thin-film magnetic head of the invention an induction-type magnetic transducer includes two magnetic pole layers and a thin-film coil placed between the pole layers and insulated from the pole layers. The distance between the outermost end of the coil and a medium facing surface is greater than a throat height and measures 10 μm or less.

2 Claims, 3 Drawing Sheets

THIN-FILM MAGNETIC HEAD HAVING IMPROVED DATA WRITING CHARACTERISTICS AND A METHOD OF MAKING THE SAME

BACKGROUND OF THE INVENTION

1. Field of the Invention

The present invention relates to a thin-film magnetic head having at least an induction-type magnetic transducer and a method of manufacturing the thin-film magnetic head.

2. Description of the Related Art

Thin-film magnetic heads have been widely used in hard disk drives used for computers and so on. Composite thin-film magnetic heads in particular have been widely used. A composite thin-film magnetic head is made of a layered structure including a recording head having an induction-type magnetic transducer for writing and a reproducing head having a magnetoresistive (MR) element for reading.

An induction-type magnetic transducer has two magnetic layers and a thin-film coil placed between the magnetic layers. The magnetic layers include magnetic pole portions opposed to each other with a gap layer in between. The pole portions are placed on a side of end faces of the magnetic layers facing toward a recording medium. The magnetic layers are magnetically coupled to each other on the other side.

With an increase in recording density of a hard disk drive used for computers and so on, the maximum frequency of data recorded or reproduced through the use of a thin-film magnetic head has reached a frequency as high as 100 MHz or above. In the case of an extremely high-speed hard disk drive, in particular, the maximum frequency of data to write has reached the order of 200 MHz. If the frequency of data to write increases, eddy current loss increases in the magnetic layers of an induction-type magnetic transducer. Accordingly, the following problems of reductions in properties have arisen: a reduction in intensity of a write magnetic field generated from the pole portions opposed to each other with the gap layer in between; an increase in delay between a write current (a current responsive to data to write) supplied to the coil and generation of a write magnetic field; and a decrease in gradient of rise of a write magnetic field with respect to time.

In order to suppress such eddy current loss, measures have been devised in related art, such as reducing a magnetic path length, that is, the length of the magnetic path made up of the magnetic layers between the medium-facing-surface-side end and the other end, or using a magnetic material with a high resistivity for the magnetic layers.

To improve recording density, it is desired that track density is increased. In Japanese Patent Application Laid-open Hei 8-87717 (1996), a thin-film magnetic head is disclosed for increasing track density. In the head an end of an insulating layer on which a thin-film coil is formed is placed at least 3 $\mu$m away from the zero throat height position (the position of the medium-facing-surface-side end of an insulating layer that defines the throat height) toward the rear gap (portions of two magnetic layers in contact with each other). In the head the start point of the thin-film coil may be placed at least 10 $\mu$m away from the zero throat height position. In the invention the throat height is the length (height) between the medium-facing-surface-side end of the pole portion and the other end. The throat height is also the length (height) between the medium facing surface and the medium-facing surface-side end of the insulating layer electrically isolating the thin-film coil.

However, the magnetic path length is not reduced in such a structure. It is therefore difficult to sufficiently increase the intensity of a write magnetic field or the gradient of rise of a write magnetic field with respect to time when the frequency of data to write increases.

SUMMARY OF THE INVENTION

It is an object of the invention to provide a thin-film magnetic head and a method of manufacturing the same for improving performance characteristics thereof in the case where the frequency of data to write is high, in particular.

A thin-film magnetic head of the invention comprises: a medium facing surface that faces toward a recording medium; first and second magnetic layers magnetically coupled to each other and including magnetic pole portions opposed to each other and placed in regions on a side of ends of the magnetic layers facing toward the recording medium, the magnetic layers each being made up of at least one layer; a gap layer provided between the pole portions of the two magnetic layers; and a thin-film coil placed between the magnetic layers, being insulated from the magnetic layers. A distance between the medium facing surface and an outermost end of the coil in a direction parallel to surfaces of the gap layer is greater than a throat height and measures 10 $\mu$m or less.

A method of the invention is provided for manufacturing a thin-film magnetic head comprising: a medium facing surface that faces toward a recording medium; first and second magnetic layers magnetically coupled to each other and including magnetic pole portions opposed to each other and placed in regions on a side of ends of the magnetic layers facing toward the recording medium, the magnetic layers each being made up of at least one layer; a gap layer provided between the pole portions of the two magnetic layers; and a thin-film coil placed between the magnetic layers, being insulated from the magnetic layers. The method includes the steps of: forming the first magnetic layer; forming the gap layer on the first magnetic layer; forming the thin-film coil on the first magnetic layer such that a distance between the medium facing surface and an outermost end of the coil in a direction parallel to surfaces of the gap layer is greater than a throat height and measures 10 $\mu$m or less; and forming the second magnetic layer on the gap layer and the coil.

According to the thin-film magnetic head or the method of manufacturing a thin-film magnetic head of the invention, the distance between the medium facing surface and the outermost end of the coil is 10 $\mu$m or less. As a result, the intensity of a write magnetic field and the gradient of rise of a write magnetic field with respect to time reach optimal values.

According to the head or the method of the invention, it is preferred that the distance between the medium facing surface and the outermost end of the coil in the direction parallel to the surfaces of the gap layer is greater than the throat height and measures 8 μm or less.

Other and further objects, features and advantages of the invention will appear more fully from the following description.

DETAILED DESCRIPTION OF THE PREFERRED EMBODIMENT

A preferred embodiment of the invention will now be described in detail with reference to the accompanying drawings. The following embodiment is an example wherein the invention is applied to a composite thin-film magnetic head.

Figure 1:
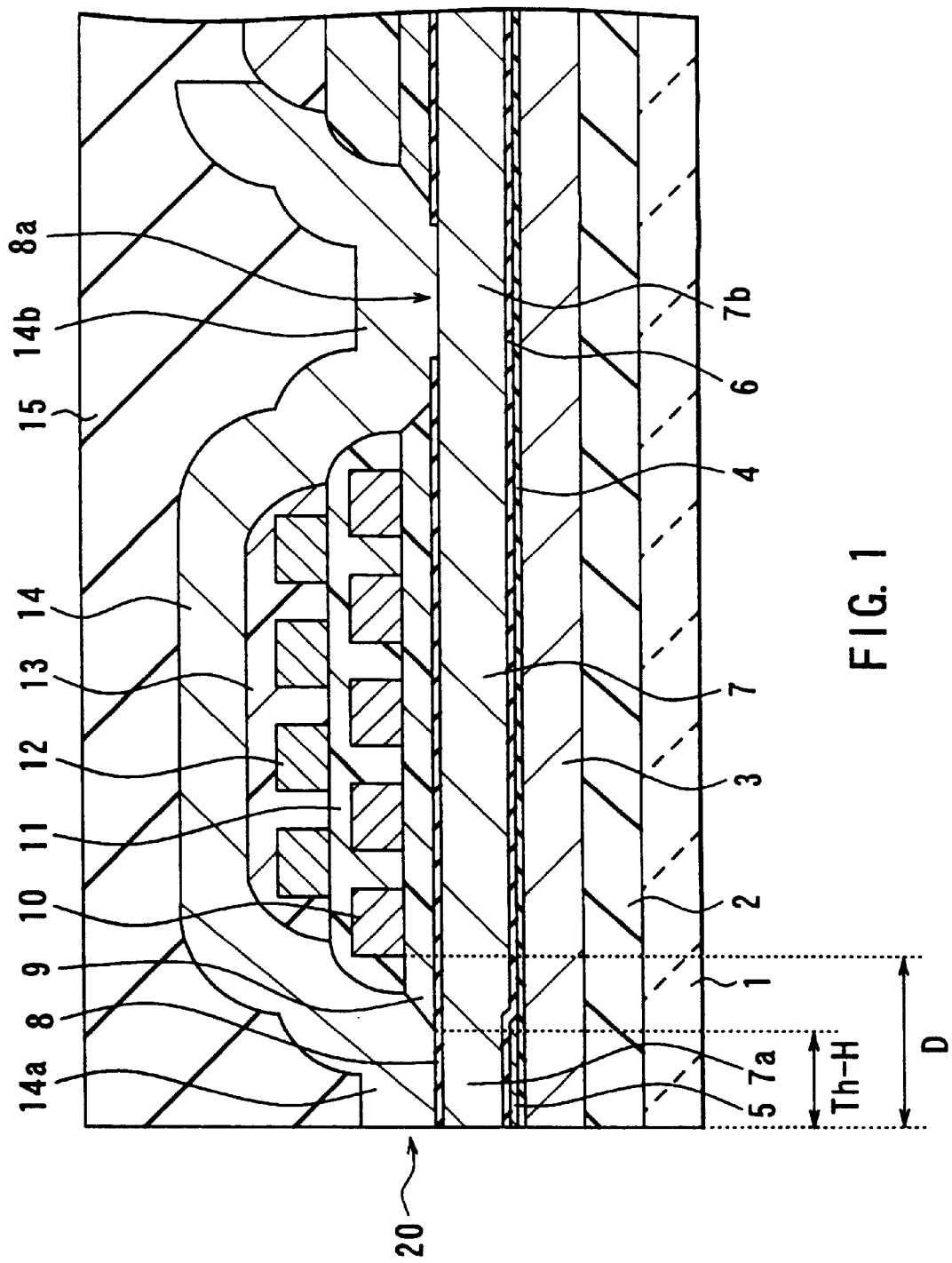
FIG. 1 is a cross section of a thin-film magnetic head of an embodiment of the invention.

FIG. 1 is a cross section of a thin-film magnetic head of an embodiment of the invention. The thin-film magnetic head comprises: a substrate 1; an insulating layer 2 provided on a surface of the substrate 1; and a bottom shield layer 3 made of a magnetic material and used for a reproducing head. The bottom shield layer 3 is provided on a surface (a top surface in FIG. 1) of the insulating layer 2 that is opposite to the surface on which the substrate 1 is placed.

The thin-film magnetic head further comprises: a bottom shield gap film 4 as an insulating layer placed on a surface (a top surface in FIG. 1) of the bottom shield layer 3 that is opposite to the surface on which the insulating layer 2 is placed; an MR element 5 for reproduction placed in a region facing a recording medium (the left side of FIG. 1) on a surface (a top surface in FIG. 1) of the bottom shield gap film 4 that is opposite to the surface on which the bottom shield layer 3 is placed; and a top shield gap film 6 as an insulating layer placed on a surface (a top surface in FIG. 1) of the MR element 5 that is opposite to the surface on which the bottom shield gap film 4 is placed and on a surface (a top surface in FIG. 1) of the bottom shield gap film 4 that is opposite to the surface on which the bottom shield layer 3 is placed. Although not shown, a pair of electrode layers are connected to the MR element 5. The electrode layers are placed between the bottom shield gap film 4 and the top shield gap film 6. The MR element 5 may be either a giant magnetoresistive (GMR) element or an anisotropic magnetoresistive (AMR) element.

The thin-film magnetic head further comprises a top shield layercum-bottom pole layer (called bottom pole layer in the following description) 7 made of a magnetic material and used for both reproducing head and recording head. The bottom pole layer 7 is placed on a surface (a top surface in FIG. 1) of the top shield gap film 6 that is opposite to the surface on which the bottom shield gap film 4 is placed. The magnetic head further comprises: a recording gap layer 8 made of an insulating film and placed on a surface (a top surface in FIG. 1) of the bottom pole layer 7 that is opposite to the surface on which the top shield gap film 6 is placed; a photoresist layer 9 that defines the throat height, placed on part of a surface (a top surface in FIG. 1) of the recording gap layer 8 that is opposite to the surface on which the bottom pole layer 7 is placed; a thin-film coil 10 of a first layer for the induction recording head, placed on a surface (a top surface in FIG. 1) of the photoresist layer 9 that is opposite to the surface on which the recording gap layer 8 is placed; a photoresist layer 11 covering the coil 10; a thin-film coil 12 of a second layer for the recording head, placed on a surface (a top surface in FIG. 1) of the photoresist layer 11 that is opposite to the surface on which the photoresist layer 9 is placed; and a photoresist layer 13 covering the coil 12. The magnetic head further comprises a top pole layer 14 made of a magnetic material. The top pole layer 14 is placed to face the bottom pole layer 7 with the recording gap layer 8, photoresist layer 9, the coil 10, the photoresist layer 11, the coil 12 and the photoresist layer 13 in between.

The induction-type magnetic transducer includes: the bottom pole layer 7, the recording gap layer 8, the photoresist layers 9, 11 and 13, the coils 10 and 12, and the top pole layer 14. The bottom pole layer 7 and the top pole layer 14 correspond to two magnetic layers (first and second magnetic layers) of the invention.

The bottom pole layer 7 and the top pole layer 14 may be made of NiFe (80 weight % Ni and 20 weight % Fe) or a high saturation flux density material such as NiFe (50 weight % Ni and 50 weight % Fe), Sendust, FeN or a compound thereof, or an amorphous of Fe-Co-Zr. Alternatively, the pole layers 7 and 14 may be made of layers of two or more of the above materials.

A contact hole 8a for making a magnetic path is formed in the recording gap layer 8 in the vicinity of the center of the coils 10 and 12. The bottom pole layer 7 and the top pole layer 14 are brought to contact with each other through the contact hole 8a and magnetically coupled to each other.

Portions of the bottom pole layer 7 and the top pole layer 14 on a side of ends facing a recording medium, the portions being opposed to each other with the recording gap layer 8 in between, are each called pole portions 7a and 14a, respectively. Portions of the bottom pole layer 7 and the top pole layer 14 in contact with each other through the contact hole 8a are each called connecting portions 7b and 14b, respectively.

The magnetic head further comprises an overcoat layer 15 that covers the top pole layer 14.

A medium facing surface (air bearing surface) 20 is an end face of the thin-film magnetic head on a side of which the MR element 5 and the pole portions 7a and 14a are formed (that is, the left-hand end face in FIG. 1).

In the embodiment, throat height Th-H is the length between the medium facing surface 20 and the end of the photoresist layer 9 closer to the medium facing surface 20.

In the embodiment, distance D is the distance between the medium facing surface 20 and the outermost end of the thin-film coils 10 and 12 in the direction parallel to surfaces of the recording gap layer 8. Distance D is preferably greater than throat height Th-H and measures 10 µm or less. More preferably, distance D is greater than throat height Th-H and measures 8 µm or less. The reason will be described later. Specifically, the throat height is 2 µm or more.

An example of a method of manufacturing the thin-film magnetic head of the embodiment will now be described. In the manufacturing method, the insulating layer 2 made of alumina ($Al_2O_3$), for example, of about 5 µm in thickness is deposited on the substrate 1 made of aluminum oxide and titanium carbide ($Al_2O_3$-TiC), for example. On the insulating layer 2 the bottom shield layer 3 made of a magnetic material and having a thickness of 2 to 3 µm is formed.

Next, on the bottom shield layer 3 alumina or aluminum nitride, for example, of 50 to 150 nm in thickness is deposited through sputtering to form the bottom shield gap film 4. On the bottom shield gap film 4 an MR film having a thickness of tens of nanometers is formed for making the MR element 5. Next, on the MR film a photoresist pattern is selectively formed where the MR element 5 is to be formed. Next, with the photoresist pattern as a mask, the MR film is etched through ion-milling, for example, to form the MR element 5. Next, on the bottom shield gap film 4 a pair of electrode layers (not shown) are formed into specific patterns. The electrode layers are electrically connected to the MR element 5.

Next, the top shield gap film 6 of 50 to 150 nm in thickness is formed on the bottom shield gap film 4 and the MR element 5. The MR element 5 is embedded in the shield gap films 4 and 6. Next, on the top shield gap film 6 the bottom pole layer 7 having a thickness of about 3 µm is formed.

Next, on the bottom pole layer 7, the recording gap layer 8 made of an insulating film such as an alumina film whose thickness is about 0.2 to 0.3 µm is formed. On the recording gap layer 8 the photoresist layer 9 having a thickness of about 1.0 to 2.0 µm is formed into a specific pattern. Next, the thin-film coil 10 of the first layer, having a thickness of 3 µm, for example, is formed on the photoresist layer 9. The photoresist layer 11 is then formed into a specific pattern on the photoresist layer 9 and the coil 10. Next, the thin-film coil 12 of the second layer, having a thickness of 3 µm, for example, is formed on the photoresist layer 11. The photoresist layer 13 is then formed into a specific pattern on the photoresist layer 11 and the coil 12.

Next, a portion of the recording gap layer 8 around the center of the coils 10 and 12 is etched to form the contact hole 8a for making the magnetic path. Next, the top pole layer 14 made of a magnetic material and having a thickness of about 3 µm, is formed on the recording gap layer 8, and the photoresist layers 9, 11 and 13. The top pole layer 14 is in contact with the bottom pole layer 7 and magnetically coupled to the bottom pole layer 7 through the contact hole 8a.

Next, the recording gap layer 8 and part of the bottom pole layer 7 are etched through ion milling, for example, using the top pole layer 14 as a mask. A trim structure is thus formed. Next, the overcoat layer 15 of alumina, for example, having a thickness of 20 to 30 µm is formed to cover the top pole layer 14. Finally, machine processing of the slider is performed to form the air bearing surface 20. The thin-film magnetic head shown in FIG. 1 is thus completed.

The functions and effects of the thin-film magnetic head of the embodiment will now be described. In the magnetic head, if a write current is fed through the coils 10 and 12, a magnetic field is generated and a magnetic flux passes through the bottom pole layer 7 and the top pole layer 14. The polarity of the write current being reversed, eddy currents are generated inside the pole layers 7 and 14 so as to interfere with the reverse of the polarity. The eddy currents result in reductions in performance characteristics such as: a reduction in intensity of the write magnetic field; an increase in delay between the write current and generation of the write magnetic field; and a decrease in gradient of rise of the write magnetic field with respect to time.

The result of an eddy current analysis using a finite element method shows that the response of a write magnetic field to a change in write current is fast if distance D between the medium facing surface 20 and the outermost end of the thin-film coils 10 and 12 is reduced. In the embodiment of the invention, the response of a write magnetic field to a change in write current is made fast by reducing distance D. Since eddy current distribution has an influence on the response of a write magnetic field to a change in write current, the characteristic of the response of the write magnetic field to a change in write current is analyzed through an analysis of changes in eddy currents.

Figure 2:
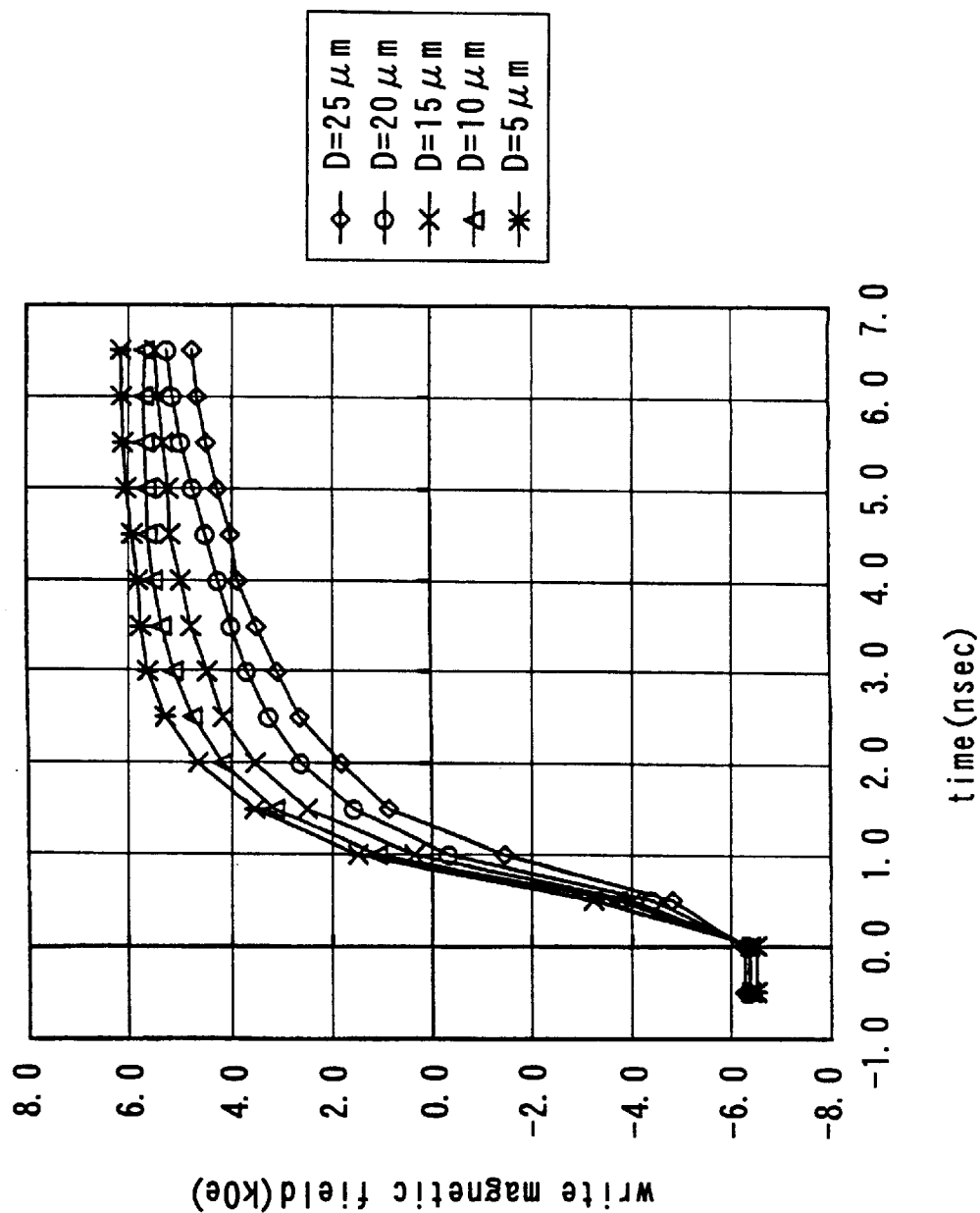
FIG. 2 is a plot for illustrating the relationship between a response of a write magnetic field and the distance between an outermost end of a thin-film coil and a medium facing surface.

FIG. 2 shows the result of an analysis performed on the characteristic of the response of a write magnetic field to a change in write current wherein distance D between the medium facing surface 20 and the outermost end of the thin-film coils 10 and 12 is changed from 5 µm to 25 µm by 5 µm. In the analysis magnetomotive force in response to the write current is changed from −0.3 ($AT_{op}$) to 0.3 ($AT_{op}$) during the interval between time 0.0 nsec and time 1.0 nsec.

The parameters of the thin-film magnetic head used for the analysis are as follows.

magnetic path length: 40 µm
throat height: 1.0 µm
track width: 1.5 µm
recording gap layer thickness: 0.3 µm
pole portion thickness of the top pole layer: 3.0 µm
pole portion thickness of the bottom pole layer: 3.0 µm
saturation flux density of the top pole layer: 1.0 T
saturation flux density of the bottom pole layer: 1.0 T As shown in FIG. 2, the smaller distance D between the medium facing surface 20 and the outermost end of the thin-film coils 10 and 12, the faster the response of the write magnetic field to the write current becomes and the more the write magnetic field intensity is increased. The way eddy currents change derived from the analysis is as follows. The smaller distance D, the more abruptly eddy currents flow during the interval between time 0.0 nsec and time 1.0 nsec. In addition, the eddy currents are then abruptly attenuated. If distance D is large, in contrast, the response of eddy currents is slow at first. Although the eddy currents rise afterward, the attenuation is small and the eddy currents tend to continue to flow.

As thus described, if distance D is reduced, it is possible to prevent reductions in characteristics such as: a reduction in intensity of the write magnetic field; an increase in delay between the write current and generation of the write magnetic field; and a decrease in gradient of rise of the write magnetic field with respect to time. In particular, the characteristics of the magnetic head are improved in the case where the frequency of data to write is high. As a result, a reduction in distance D achieves improvements in nonlinear transition shift (NLTS) and in overwrite property, that is, the property required for writing data over data already written on a recording medium.

Figure 3:
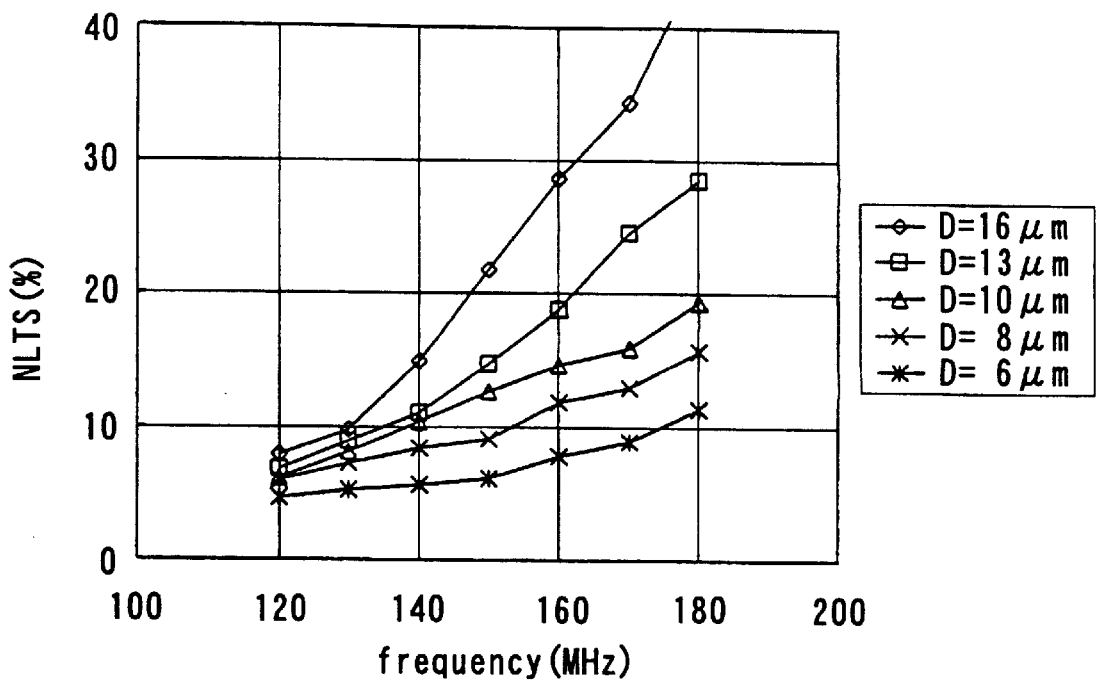
FIG. 3 is a plot for illustrating the relationship between an NLTS and the distance between the outermost end of the thin-film coil and the medium facing surface.
Figure 4:
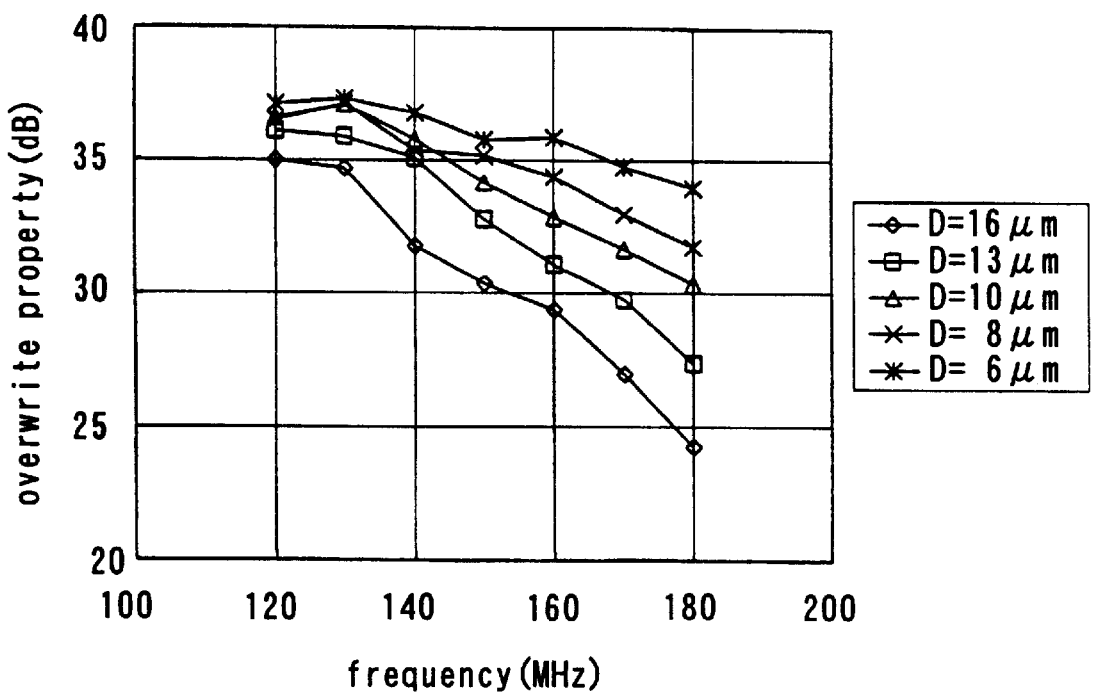
FIG. 4 is a plot for illustrating the relationship between an overwrite property and the distance between the outermost end of the thin-film coil and the medium facing surface.

Next, the result of measurement taken to obtain a preferred range of distance D between the medium facing surface 20 and the outermost end of the thin-film coils 10 and 12 will be shown. FIG. 3 shows the result of measurement taken to obtain the relation between the frequency of data to write and the NLTS when distance D is 6 $\mu$m, 8 $\mu$m, 10 $\mu$m, 13 $\mu$m and 16 $\mu$m. FIG. 4 shows the result of measurement taken to obtain the relation between the frequency of data to write and the overwrite property when distance D is 6 $\mu$m, 8 $\mu$m, 10 $\mu$m, 13 $\mu$m and 16 $\mu$m. In the result shown, the overwrite property is a residual component of 33 MHz indicated in decibel (dB) when data is written at the frequency of data to write, and in density of 300 kFCI (flux change per inch) over a region where data is written at a frequency of 33 MHz and in density of 50 kFCI. The NLTS is an NLTS measured through the fifth harmonic method using a fifth harmonic on data recorded at a maximum frequency of 200 MHz and in density of 300 kFCI, and indicated in percent. The parameters of the magnetic head used for the measurement are as follows.

magnetic path length: 40 $\mu$m
throat height: 1.0 $\mu$m
track width: 1.5 $\mu$m
recording gap layer thickness: 0.3 $\mu$m
pole portion thickness of the top pole layer: 3.0 $\mu$m
pole portion thickness of the bottom pole layer: 3.0 $\mu$m
saturation flux density of the top pole layer: 1.0 T
saturation flux density of the bottom pole layer: 1.0 T As shown in FIG. 3, the smaller distance D, the more the NLTS is improved. In addition, the NLTS is reduced to a smaller value even in the high frequency range. This result supports the analysis result shown in FIG. 2. Similarly, the smaller distance D, the more the overwrite property is improved, as shown in FIG. 4.

In general, it is required that the NLTS is 20% or less and the overwrite property is 30 dB or more. To satisfy these requirements, distance D is required to be 10 $\mu$m or less. Therefore, distance D is 10 $\mu$m or less in the embodiment. As shown in FIG. 3 and FIG. 4, distance D is preferably 8 $\mu$m or less. It is a necessary condition that distance D is greater than throat height Th-H.

According to the embodiment described so far, distance D between the medium facing surface 20 and the outermost end of the thin-film coils 10 and 12 is greater than the length of the pole portions 7a and 14a, that is, throat height Th-H and measures 10 $\mu$m or less. As a result, the intensity of a write magnetic field and the gradient of rise of a write magnetic field with respect to time reach optimal values. Therefore, according to the embodiment, it is possible to prevent reductions in characteristics such as: a reduction in intensity of a write magnetic field; an increase in delay between a write current and generation of a write magnetic field; and a decrease in gradient of rise of a write magnetic field with respect to time. In particular, the characteristics of the thin-film magnetic head are improved in the case where the frequency of data to write is high. As a result, the embodiment achieves improvements in NLTS and in overwrite property. The characteristics of the head are further improved if distance D is 8 $\mu$m or less.

The present invention is not limited to the foregoing embodiment but may be practiced in still other ways. For example, although the bottom pole layer and the top pole layer 14 are each made up of one layer in the foregoing embodiment, the pole layers may be each made up of more than one layer.

In the foregoing embodiments the thin-film magnetic head is disclosed, comprising the MR element for reading formed on the base body and the induction-type magnetic transducer for writing stacked on the MR element. Alternatively, the MR element may be stacked on the magnetic transducer.

That is, the induction-type magnetic transducer for writing may be formed on the base body and the MR element for reading may be stacked on the transducer. Such a structure may be achieved by forming a magnetic film functioning as the top pole layer of the foregoing embodiments as a bottom pole layer on the base body, and forming a magnetic film functioning as the bottom pole layer of the embodiments as a top pole layer facing the bottom pole layer with a recording gap film in between. In this case it is preferred that the top pole layer of the induction-type magnetic transducer functions as the bottom shield layer of the MR element as well.

A base body having a concavity is preferred for the thin-film magnetic head having such a structure. If the coils are formed in the concavity of the base body, the thin-film magnetic head is further reduced in size.

Alternatively, the insulating layers formed between the thin-film coils forming the coils of the induction-type magnetic transducer may be all made of inorganic layers.

The invention may be applied to a thin-film magnetic head having only an induction-type magnetic transducer for performing both reading and writing.

According to the thin-film magnetic head or the method of manufacturing the same of the invention described so far, the distance between the medium facing surface and the outermost end of the thin-film coil is 10 $\mu$m or less. As a result, the intensity of a write magnetic field and the gradient of rise of a write magnetic field with respect to time reach optimal values. In particular, the characteristics of the thin-film magnetic head are improved in the case where the frequency of data to write is high.

The characteristics of the head are further improved if the distance between the medium facing surface and the outermost end of the thin-film coil is 8 $\mu$m or less.

Obviously many modifications and variations of the present invention are possible in the light of the above teachings. It is therefore to be understood that within the scope of the appended claims the invention may be practiced otherwise than as specifically described.

What is claimed is:

1. A thin-film magnetic head comprising:
   a medium facing surface that faces toward a recording medium;

first and second magnetic layers magnetically coupled to each other and including magnetic pole portions that are opposed to each other and placed in regions on a side of ends of the magnetic layers facing toward the recording medium, the magnetic layers each being made up of at least one layer;

a gap layer provided between the pole portions of the two magnetic layers; and a thin-film coil placed between the magnetic layers, being insulated from the magnetic layers; wherein a distance between the medium facing surface and an outermost end of the coil in a direction parallel to surfaces of the gap layer is greater than a throat height and measures 8 μm or less, and at least when data is written at a frequency of 180 MHz, the magnetic head exhibits a nonlinear transition shift of 20% or less and an overwrite property of 30 dB or more.

2. A method of manufacturing a thin-film magnetic head, the head comprising:

a medium facing surface that faces toward a recording medium;

first and second magnetic layers magnetically coupled to each other and including magnetic pole portions that are opposed to each other and placed in regions on a side of ends of the magnetic layers facing toward the recording medium, the magnetic layers each being made up of at least one layer;

a gap layer provided between the pole portions of the two magnetic layers; and a thin-film coil placed between the magnetic layers, being insulated from the magnetic layers;

wherein, at least when data is written at a frequency of 180 MHz, the magnetic head exhibits a nonlinear transition shift of 20% or less and an overwrite property of 30 dB or more;

the method including the steps of:

forming the first magnetic layer;

forming the gap layer on the first magnetic layer;

forming the thin-film coil on the first magnetic layer such that a distance between the medium facing surface and an outermost end of the coil in a direction parallel to surfaces of the gap layer is greater than a throat height and measures 8 μm or less; and forming the second magnetic layer on the gap layer and the coil.

* * * * *